United States Patent
Albert et al.

(10) Patent No.: US 7,430,351 B2
(45) Date of Patent: Sep. 30, 2008

(54) NON-LINEAR FEMTOSECOND PULSE FILTER WITH HIGH CONTRAST

(75) Inventors: Olivier Albert, Orsay (FR); Jean Etchepare, Verrieres le Buisson (FR); Aurélie Jullien, Paris (FR); Gilles Cheriaux, Fresnes (FR); Nikolay Minkovski, Sofia (BG); Solomon Saltiel, Sofia (BG)

(73) Assignees: Thales (FR); Le Centre National de la Recherche Scientifique (FR); Ecole Polytechnique (FR); Ecole Nationale Superieure des Techniques Avancees (FR)

( * ) Notice: Subject to any disclaimer, the term of this patent is extended or adjusted under 35 U.S.C. 154(b) by 542 days.

(21) Appl. No.: 11/289,627

(22) Filed: Nov. 30, 2005

(65) Prior Publication Data
US 2006/0170858 A1     Aug. 3, 2006

(30) Foreign Application Priority Data
Nov. 30, 2004   (FR) .................. 04 12694

(51) Int. Cl.
G02B 6/00 (2006.01)
C09K 19/02 (2006.01)
H01S 3/00 (2006.01)

(52) U.S. Cl. .................. 385/122; 385/11; 349/169; 359/333

(58) Field of Classification Search .................. 385/122, 385/11; 359/333, 337.2, 337.22, 342, 343; 349/169, 104, 106

See application file for complete search history.

(56) References Cited

U.S. PATENT DOCUMENTS

| | | | | |
|---|---|---|---|---|
| 5,452,123 | A | * | 9/1995 | Asher et al. .................. 359/296 |
| 6,081,367 | A | * | 6/2000 | Yokoyama et al. ....... 359/337.2 |
| 6,201,916 | B1 | * | 3/2001 | Eggleton et al. ............ 385/122 |
| 6,717,718 | B1 | * | 4/2004 | Kelsoe et al. ................ 359/333 |

OTHER PUBLICATIONS

Sharan et. al., Current Science, vol. 82, No. 1. Jan. 10, 2002 pp. 30-37.*
A. Jullien, O. Albert, G. Chériaux, J. Etchepare, S. Kourtev, N. Minkovski, and S. M. Saltiel, "Highly efficient temporal cleaner for femtosecond pulses based on cross-polarized wave generation in a dual crystal scheme," *Applied Physics B*, in print 2006.
V. Chvykov, P. Rousseau, S. Reed, G. Kalinchenko, and V. Yanovsky, "Generation of $10^{11}$ contrast 50 TW laser pulses," *Optics Letters*, vol. 31, No. 10, pp. 1456-1458, 2006.
A. Cotel, N. Forget, A. Jullien, O. Albert, G. Chériaux, and C. L. Blanc, "High-efficiency temporal pulse cleaning for a 1µm front end on a petawatt-class laser," in *CLEO*, No. CMA7, 2006.
A. Jullien, O. Albert, G. Chériaux, J. Etchepare, S. Kourtev, N. Minkovski, and S. M. Saltiel, "Highly efficient xpw temporal contrast filter for ultra intense femtosecond pulses," in *CLEO*, No. JThA6, 2006.

(Continued)

*Primary Examiner*—Brian M Healy
(74) *Attorney, Agent, or Firm*—Lowe Hauptman Ham & Berner, LLP

(57) ABSTRACT

The invention relates to a non-linear optical filter capable of transmitting an electromagnetic pulse with a duration of less than about 1 picosecond, provided with means for generating an electromagnetic field E with a linear polarization from this pulse, and with a crystal C1 of cubic geometry capable of generating an electromagnetic field $E'_1$ from E with a linear polarization orthogonal to that of E. It comprises means for generating at least one other electromagnetic field $E'_2$ capable of producing constructive interferences with the electromagnetic field $E'_1$.

15 Claims, 5 Drawing Sheets

OTHER PUBLICATIONS

A. Cotel, A. Jullien, N. Forget, O. Albert, G. Chériaux, and C. L. Blanc, "Nonlinear temporal pulse cleaning of 1μm optical parametric chirped-pulse amplifier," *Applied Physics B*, 2006.

A. Jullien, O. Albert, J. Etchepare, F. Augé-Rochereau, J. P. Chambaret, G. Cheriaux, F. Falcoz, N. Minkovski, and S. M. Saltiel, "Temporal contrast enhanced to $10^{-10}$ for petawatt scale femtosecond lasers," in *CLEO*, No. JFA5, 2005.

A. Jullien, O. Albert, J. Etchepare, F. Augé-Rochereau, J.-P. Chambaret, G. Chériaux, S. Kourtev, N. Minkovski, and S. M. Saltiel, "Temporal contrast enhancement to $10^{-10}$ for petawatt class femtosecond lasers," in *UFO/HFSW*, 2005.

A. Jullien, O. Albert, G. Chériaux, J. Etchepare, S. Kourtev, N. Minkovski, and S. M. Saltiel, "Non linear ellipse rotation in cubic crystals, application for cross polarized wave generation," *J. Opt. Soc. Am. B*, vol. 22, No. 12, pp. 2635-2641, 2005.

A. Jullien, O. Albert, F. Burgy, G. Hamoniaux, J.-P. Rousseau, J.-P. Chambaret, F. Augé-Rochereau, G. Chériaux, J. Etchepare, N. Minkovski, and S. M. Saltiel, "$10^{-10}$ temporal contrast for femtosecond ultraintense lasers by cross-polarized wave generation," *Optics Letters*, vol. 30, No. 8, pp. 920-922, 2005.

Homoelle D et al: "Pulse contrast enhancement of high-energy pulses by use of a gas-filled hollow waveguide" Optics Letters Opt. Soc. America USA, vol. 27, No.18 Sep. 15, 2002 pp. 1646-1648.

N. Minkowski et al : Nonlinear polarization rotation and orthogonal polarization generation axperience in a single-beam configuration J. Opt. Soc. Am. B, vol. 21, No. 9 Sep. 9, 2004, pp. 1659-1664.

Kalashnikov M P et al: Characterization of a nonlinear filter for the front-end of a high contrast double-CPA Ti: sapphire laser Optics Express Opt. Soc. America USA, vol. 12, No. 21 Oct. 18, 2004.

\* cited by examiner

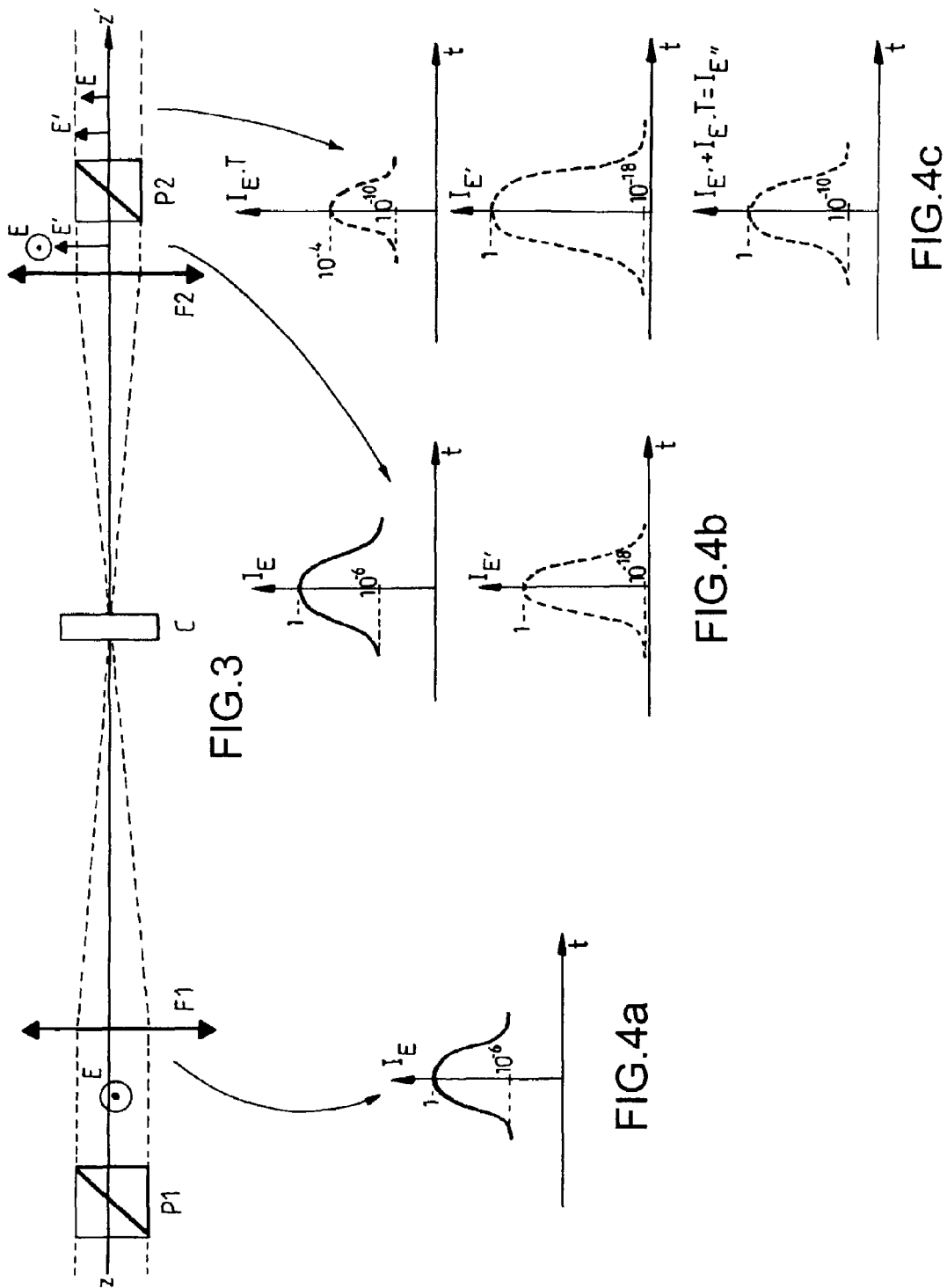

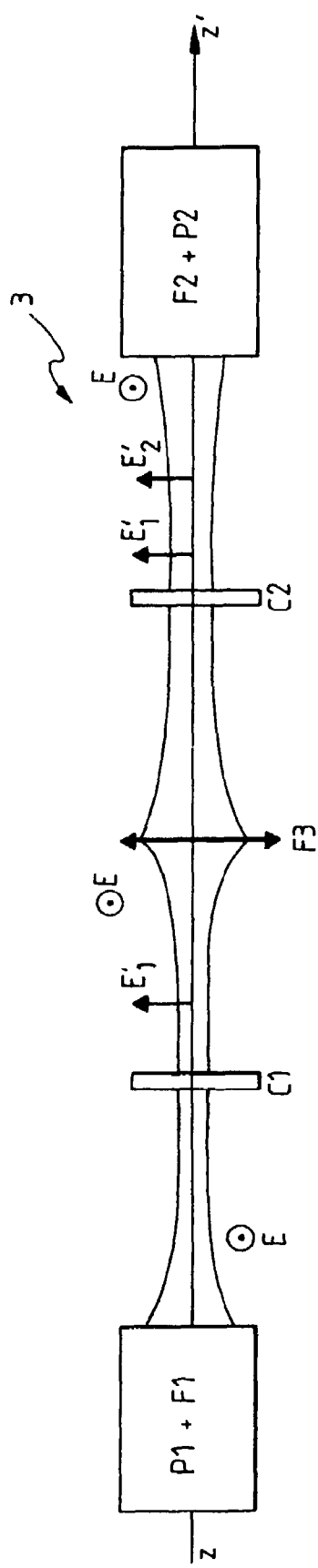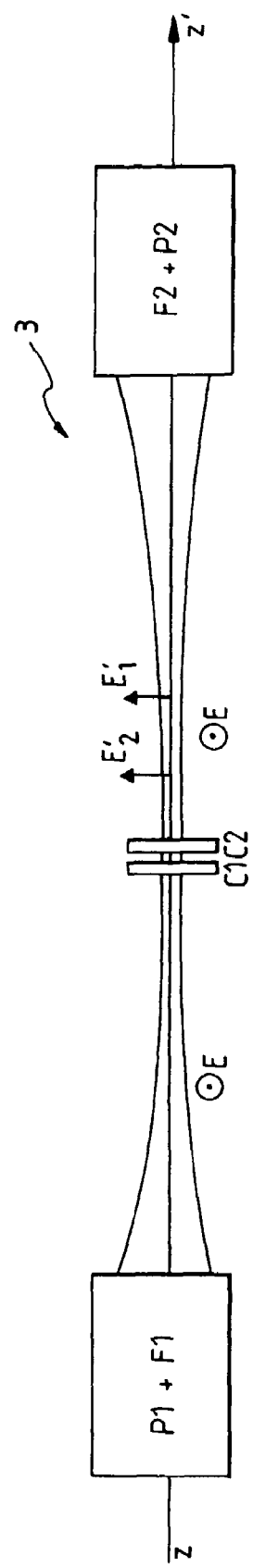

NON-LINEAR FEMTOSECOND PULSE FILTER WITH HIGH CONTRAST

TECHNICAL FIELD

The invention relates to a non-linear femtosecond pulse filter with high temporal contrast, and to a generator of such pulses.

The field of the invention is that of lasers with pulses which are ultra-short ($10^{-12}$ to $10^{-15}$ second) and ultra-intense, that is to say more than 1 nanojoule.

BACKGROUND OF THE INVENTION

Typically, by way of nonlimiting example, a high-power laser using a Ti:Al$_2$O$_3$ crystal and based on a chirped pulse amplification (CPA) method generates not only a femtosecond pulse but also nanosecond amplified spontaneous emission (ASE) as well as parasitic pulses, as illustrated on the curve in FIG. 1.

One important characteristic of these lasers is the temporal contrast, defined by the intensity ratio between the ASE pedestal and the femtosecond pulse. For lasers of the 100 TW class, the temporal contrast commonly reaches 6 orders of magnitude, that is to say $10^{-6}$.

This type of laser is used, for example, for laser-material interaction experiments. It is then focused with an intensity of $10^{21}$ Wcm$^{-2}$ onto a solid target in order to generate plasma. The ASE can reach an intensity of $10^{14}$ Wcm$^{-2}$ in this case, which is sufficient to pre-ionize the target before the femtosecond pulse arrives. The pulse therefore has to be temporally cleaned: it is necessary to suppress the pre-pulses and to lower the ASE level by at least 3 orders of magnitude. For this type of application, it is important for the temporal contrast to reach at least $10^{-9}$.

One solution for improving the temporal contrast consists in using a non-linear filtering technique based on a process of generating an orthogonally polarized wave in a non-linear crystal. This process is linked with the 3$^{rd}$ order non-linear optical susceptibility of cubic crystals: the wave generated with an orthogonal polarization has the same wavelength and is proportional in intensity to the cube of the initial pulse, which is illustrated in FIG. 2. It will be recalled that the intensity $I_E$ of a field E is of the form $I_E$=E.E*, E* being the conjugate of E.

The direction of the field E at the entry of the crystal and that of the field E' at the exit, which is orthogonal to that of E, are represented in FIG. 2a together with their propagation direction Oz. The intensity $I_E$ of E and the intensity $I_{E'}$ of E', which are represented on the curves in FIG. 2b, illustrate the relation $I_{E'}$=k.$I_E^3$, where k includes the 3$^{rd}$ order susceptibility. The polarizations of the fields appear on the curves: the solid-line curves correspond to the polarization of the incident field and the dashed curves correspond to that of the converted field, which is orthogonal to the former. The temporal contrast thus theoretically passes from a value of $10^{-6}$ to $10^{-18}$.

FIG. 3a represents an example of such a non-linear filter. The axis z'z represents the propagation axis of the electromagnetic field. At the entry of the filter, the pulse to be cleaned is generated for example by a Ti:Al$_2$O$_3$ laser using a chirped pulse amplifier (CPA). A first polarizer P1 makes it possible to obtain a linearly polarized field E from this pulse. This field is focused by means of an optical focusing system F1 onto a cubic crystal C, that is to say one which does not have a difference in group velocity between the incident field and the generated field, such as a BaF$_2$ crystal which is furthermore transparent over a wide spectral range from the ultraviolet to the infrared. The efficiency of the conversion by the crystal C is proportional to: the length of the crystal×the square of the intensity of the field incident on the crystal. This crystal C, with a length of about 2 mm, converts about 10% of the incident field into a field E' with a linear polarization orthogonal to that of E. About 90% of the incident field is transmitted by the crystal C without being converted: this unconverted field, with the same polarization as the incident field, carries the ASE. These fields are collimated by a second optical system F2, and a second polarizer P2 is provided in order to cut out the ASE and the unconverted field while transmitting 100% of the converted field E'.

FIG. 4 schematize the improvement of the contrast provided by the filter. The polarizations are identified in the same way as in FIG. 2b. Let $I_E$ be the intensity of the field E incident on the crystal C, as represented in FIG. 4a. After the crystal C and before the polarizer P2, FIG. 4b represents the converted field E' whose intensity $I_{E'}$ has a contrast of $10^{-18}$, and the unconverted residue of $I_E$. After P2, the final filtered signal $I_E''$ is composed of $I_{E'}$ transmitted fully plus the residue of $I_E$ attenuated by the extinction factor T of P2, typically from $10^{-4}$ to $10^{-6}$. $I_E''$ therefore has a contrast of between $10^{-10}$ and $10^{-12}$, depending on the value of the extinction factor of P2.

The main limitation of this filter is its longevity and its stability. In fact, the crystal deteriorates at the end of a few hours when it is subjected to an incident field E whose intensity is more than $10^{12}$ Wcm$^{-2}$, the intensity which is necessary in order to obtain a good efficiency of the filter.

There is another limitation of this filter, associated with the self-phase modulation. The high intensity value necessary for good efficiency of the filter also generates modulation of the phase and the amplitude of the spectrum of the femtosecond pulse, which is referred to as SPM (self-phase modulation). The quality of the pulse is therefore degraded and it is therefore difficult to use, for example during subsequent amplification. This SPM furthermore degrades the temporal profile of the pulse, which is detrimental to the final contrast.

SUMMARY OF THE INVENTION

It is therefore an important object of the invention to produce a reliable and robust filter, which resolves the problems associated with the high intensity value on the non-linear crystal and makes it possible to obtain a beam of good quality with a high temporal contrast.

In order to achieve this object, the invention relates to a non-linear optical filter capable of transmitting an electromagnetic pulse with a duration of less than about 1 picosecond, which is provided with means for generating an electromagnetic field E with a linear polarization from this pulse, and with a crystal C1 of cubic geometry capable of generating an electromagnetic field E'$_1$ from E with a linear polarization orthogonal to that of E. It is principally characterized in that it comprises means for generating at least one other electromagnetic field E'$_2$ capable of producing constructive interferences with the electromagnetic field E'$_1$.

In this way, the final efficiency is kept while moderating the intensity value on each of the crystals, and maintaining a good temporal contrast. This makes it possible to overcome the limitations explained above.

According to a first embodiment, the means for generating E'$_2$ comprise at least one other crystal C2 of cubic geometry, capable of receiving the field E'$_1$ at the entry and of generating the field E'$_2$ at the exit.

Preferably, it furthermore comprises means for forming an image of C1, and the other crystal C2 coincides with the image of C1.

According to another embodiment, the means for generating E'$_2$ comprise the crystal C1 and an optical system capable of forming the image of C1 on itself.

The invention also relates to a generator of electromagnetic pulses with a duration of less than about 1 picosecond, equipped with an oscillator 1, characterized in that it comprises a non-linear filter 3 as described above.

It optionally comprises at least one amplifier, for example a chirped pulse amplifier.

BRIEF DESCRIPTION OF THE DRAWINGS

Other characteristics and advantages of the invention will become apparent on reading the following detailed description, which is given by way of nonlimiting example and with reference to the appended drawings in which.

DETAILED DESCRIPTION

Figure 1:
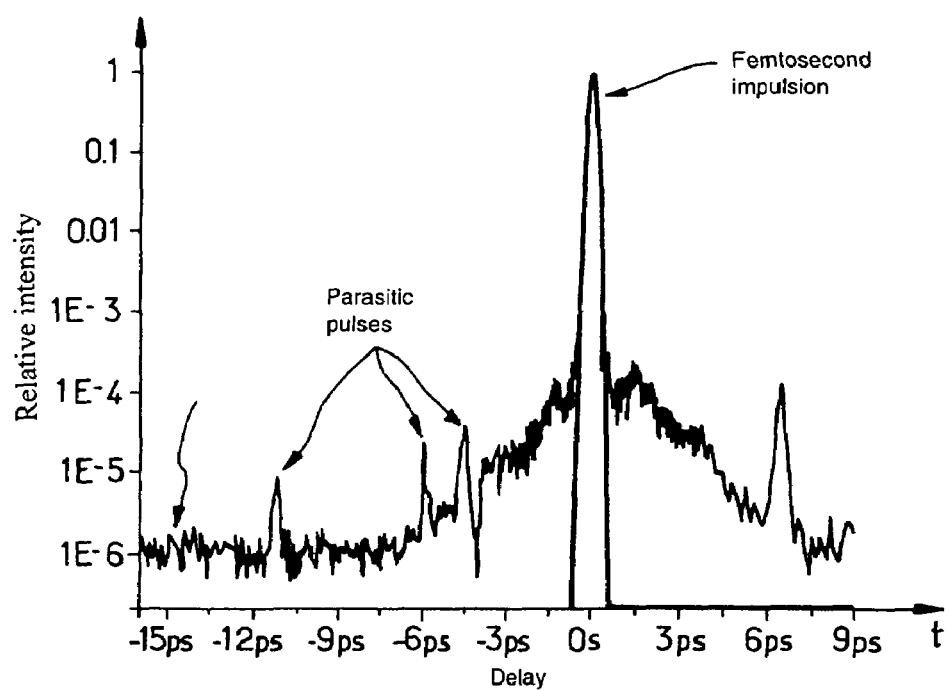
FIG. 1, already described, schematically represents an example of a temporal profile of a femtosecond pulse, FIGS. 2a and 2b, already described, schematically represent respectively the direction and the intensity of the field E at the entry of the crystal and that of the field E' at the exit, FIG. 3, already described, schematically represents an example of a known non-linear filter, FIGS. 4a, 4b and 4c schematically represent the intensities I$_E$ of the field E at the entry (FIG. 4a), I$_{E'}$ of the converted field E' and the intensity of the unconverted residue of I$_E$ at the exit of the crystal C, before the second polarizer P2 (FIG. 4b), and the intensity of the residue of I$_E$ attenuated by P2 and the intensities I$_{E'}$ and I$_{E''}$ after P2 (FIG. 4c), FIG. 5 schematically represents a first variant of the first embodiment of a filter according to the invention, FIG. 6 schematically represents a second variant of the first embodiment of a filter according to the invention, FIG. 7 schematically represents a second embodiment of a filter according to the invention, FIG. 8 schematically represents a third embodiment of a filter according to the invention, FIG. 9 schematically represents a laser pulse generator according to the invention, and FIGS. 10a and 10b schematically represent an example of a known CPA (FIG. 10a) and the effect of each element on the intensity curve of the pulse (FIG. 10b).
Figure 2A:
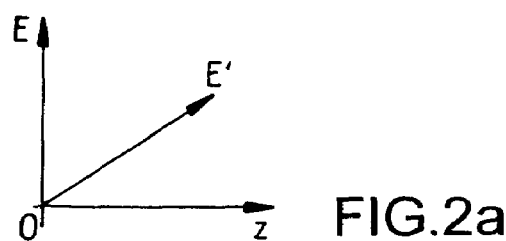
Figure 2B:
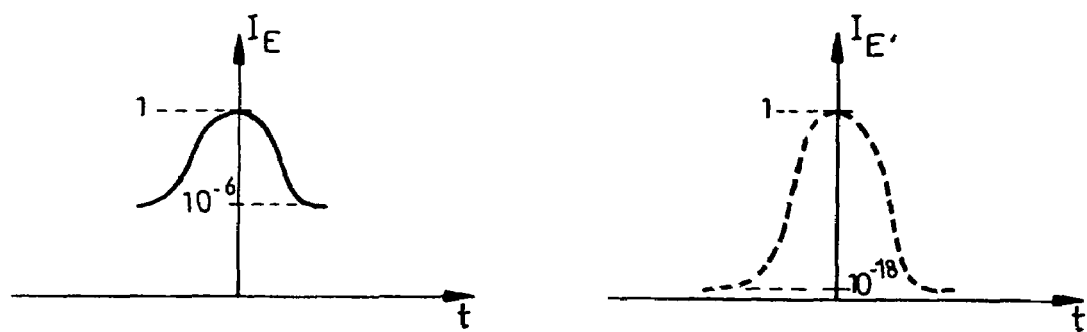

The principle of the invention consists in obtaining at least one second field E'$_2$ so that the field E'$_1$ generated by the crystal C1 and this field E'$_2$ produce constructive interferences. This equates with generalizing the principle of the filter described in the preamble to at least two crystals, or a single crystal in a multipass configuration.

According to a first embodiment, this second field E'$_2$ is generated by a second crystal C2 of cubic geometry, which receives at the entry the field E'$_1$ converted by C1 and the field E transmitted by C1 without being converted. C2 consists of the same material as C1, and is oriented so as to generate a field E'$_2$ with the same polarization as the field E'$_1$. The fields E'$_2$ and E'$_1$ thus have the same temporal properties. Furthermore, C2 lies on the image of C1: the fields then have the same spatial properties and can therefore produce constructive interferences.

In this way, the intensity incident on each crystal is reduced relative to the layout with one crystal, for the same final efficiency. Since the intensity on each crystal is reduced by a factor of 2, the longevity of the crystals is preserved and the self-phase modulation is reduced; the qualities of the beam are thus preserved.

This first embodiment of a non-linear optical filter 3 comprises several variants.

In what follows, elements which are the same will have the same references from one figure to another.

According to a first variant represented in FIG. 5, an optical imaging system F3 such as a lens is arranged between C1 and C2; furthermore, C2 is placed so as to coincide with the image of C1 formed by the imaging system F3. Like the crystal C1, the crystal C2 converts a part of the incident field E and transmits the other part without converting it. The field E'$_1$ converted by C1 passes through C2 without being converted, and therefore without its temporal and spatial properties being modified. From the part of the field E not converted by C1, C2 furthermore generates a field E'$_2$ having the same temporal and spatial properties as E'$_1$. Finally, the interferences produced by E'$_1$+E'$_2$ are obtained at the exit of C2.

A second variant is based on self-focusing, the principle of which will be summarized. The self-focusing of a material affects the spatial profile of the pulse in this material, which may be assimilated to a lens whose focal length varies with the intensity. If it is assumed that the spatial profile of a pulse is Gaussian, then its intensity at the centre will be higher than at the edge. When the intensity is high, however, the index n of the material varies with the intensity I and will therefore be different for each point of the pulse. The centre of the beam encounters a higher index, and therefore passes through the material at a lower velocity (v=c/n). The wavefront of the beam will consequently become progressively more curved.

This distortion is identical to that imposed by a graded-index lens of positive focal length fc (Kerr lens).

Figure 6:
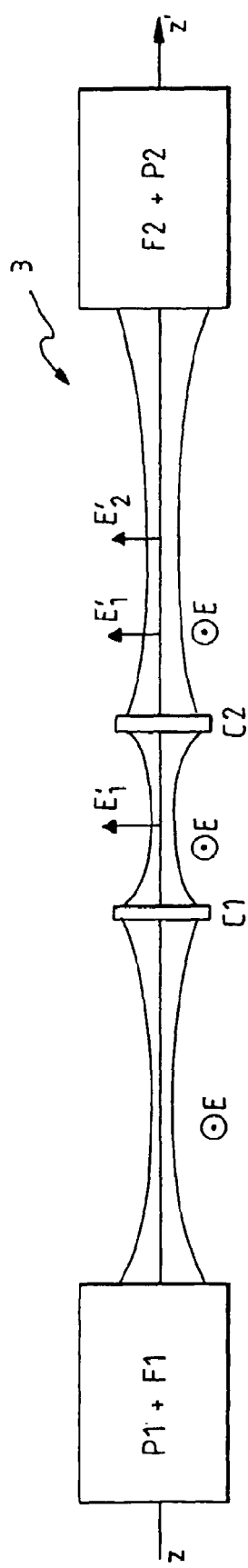

According to this principle, C1 also behaves as a Kerr lens of focal length fc as illustrated in FIG. 6, so long as certain conditions are satisfied. C1 must be placed outside the focus of the focusing system F1 but close to it, that is to say at a distance f1+ϵ from F1, f1 being the focal length of F1 and ϵ being less than 0.10 f1 but not zero; the new optical system constituted by the focusing system F1 and the Kerr lens, which is induced in the crystal C1 and has a focal length fc, makes it possible to produce the image of C1. C2 is positioned in this image plane.

According to a second embodiment represented in FIG. 7, the second field E'$_2$ is also generated by a second crystal C2 of cubic geometry. C1 and C2 both lie around the focus of the focusing system F1, f1 being the focal length of F1; C1 and C2 are close to each other, that is to say they are separated by a distance less than the Rayleigh distance. In this way, the beam has the same spatial characteristics of amplitude and phase on both crystals. It is then superfluous to form the image of one on the other.

It will be recalled that the Rayleigh distance defines the distance over which the Gaussian laser beam can be considered as collimated.

These first and second embodiments are described with two crystals C1 and C2. They may likewise be implemented with more than two crystals so as to obtain as many converted fields E' as there are crystals, in order to produce constructive interferences between these fields E'.

Figure 8:
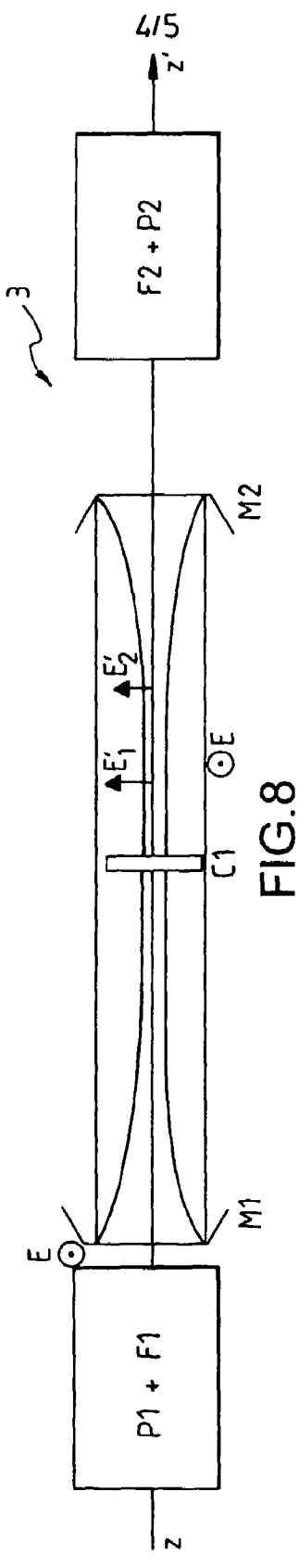

According to a third embodiment of a non-linear optical filter 3, the second field E'$_2$ is obtained with the single crystal C1 in a multipass configuration with one or more mirrors. This embodiment is represented in FIG. 8 with two mirrors M1 and M2. The mirrors M1 and M2 are placed so that the image of C1 formed by these mirrors coincides with C1.

When M1 and M2 have the same focus, for example, C1 lies at the focus.

The non-linear optical filter 3 according to the invention is used, in particular, in order to produce a generator of ultra-intense and ultra-short laser pulses with a high temporal contrast.

Figure 9:
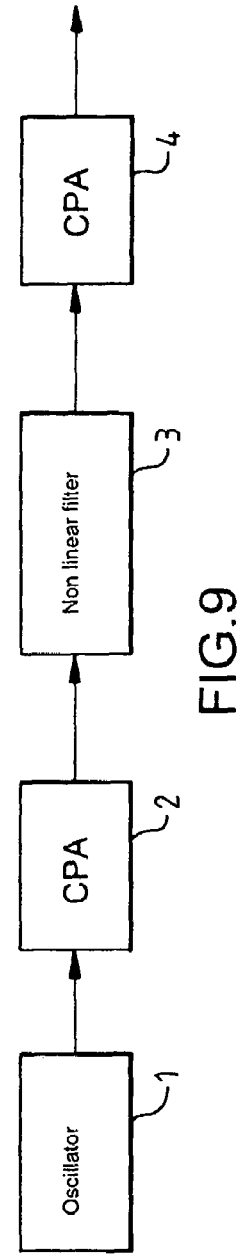

An example of such a generator will be described with reference to FIG. 9. It comprises a laser oscillator 1 capable of generating a femtosecond pulse of the order of one nanojoule. The oscillator is connected to a chirped pulse amplifier or "CPA" 2, which amplifies the pulse while generating an ASE and the parasitic pulses. The CPA is therefore connected to a non-linear filter 3 according to the invention, in order to rid the pulse of the ASE and the parasitic pulses, without the crystal being degraded. The cleaned pulse is then amplified by another CPA 4.

Figures 10A, 10B:
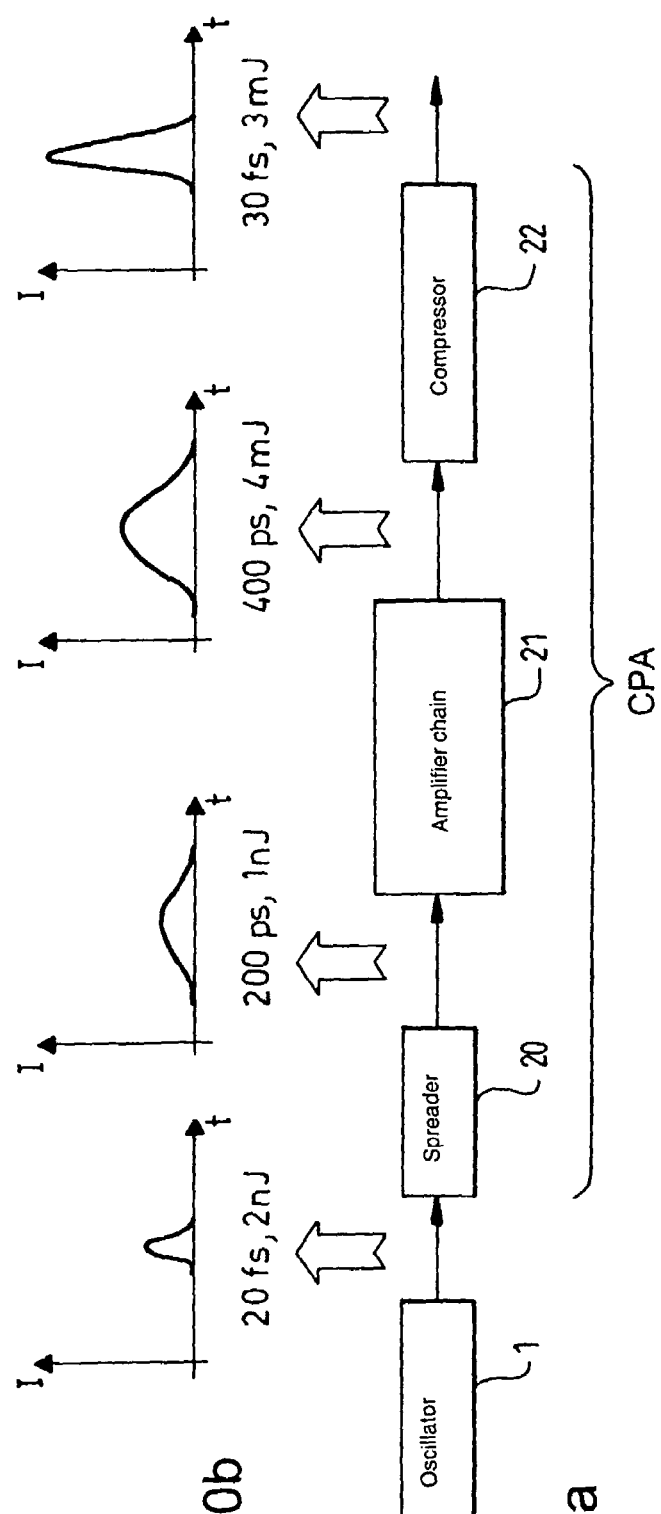

An example of a CPA is represented in FIG. 10a. It conventionally comprises a temporal spreader 20, an amplifier chain 21 mainly responsible for the ASE formation, and a compressor 22. The amplifier chain 21 comprises, for example, a pre-amplifier or one or two power amplifiers. FIG. 10b represent the effect of each element on the intensity curve of the pulse. An example pulse of 2 nanojoule (nJ) is generated by the oscillator 1 over 20 femtoseconds (fs). It is spread over 200 picoseconds (ps) by the spreader 20 into a pulse of 1 nJ, then amplified by the amplifier chain 21 in order to obtain a pulse of 4 millijoules (mJ) over 400 ps, and compressed by the compressor 22 into a pulse of 3 mJ over 30 fs, as illustrated on the intensity curves in FIG. 10b.

The invention claimed is:

1. A non-linear optical filter capable of transmitting an electromagnetic pulse with a duration of less than about 1 picosecond, comprising:
   means for generating an electromagnetic field E with a linear polarization from this pulse, and with a crystal C1 of cubic geometry capable of generating an electromagnetic field $E'_1$ from E with a linear polarization orthogonal to that of E, crystal C1 of cubic geometry capable of generating an electromagnetic field $E'_1$ from E with a linear polarization orthogonal to that of E, comprising means for generating at least one other electromagnetic field $E'_2$ capable of producing constructive interferences with the electromagnetic field $E'_1$.

2. The filter according to claim 1, wherein the means for generating $E'_2$ comprise at least one other crystal C2 of cubic geometry, capable of receiving the field $E'_1$ at the entry and of generating the field $E'_2$ at the exit.

3. The filter according to claim 2, wherein the means for generating the field E comprise an optical focusing system, and in that the two crystals C1 and C2 lie at the Rayleigh distance from the optical focusing system.

4. The filter according to claim 2, wherein it furthermore comprises means for forming an image of C1, and in that the other crystal C2 coincides with the image of the crystal C1.

5. The filter according to claim 3, wherein the means for forming the image of the crystal C1 comprise an optical focusing system lying between the two crystals C1 and C2.

6. The filter according to claim 4, wherein the means for generating the field E comprise an optical focusing system, and in that the means for forming the image of the crystal C1 include the optical focusing system and the crystal C1 capable of generating a self-focusing phenomenon of focal length fc.

7. The filter according to claim 1, wherein the means for generating $E'_2$ comprise the crystal C1 and an optical system capable of forming the image of C1 on itself.

8. A generator of laser pulses with a duration of less than about 1 picosecond, equipped with an oscillator, comprising a non-linear filter according to claim 1.

9. A laser pulse generator according to claim 8, wherein it comprises at least one amplifier chain.

10. A laser pulse generator according to claim 9, wherein it comprises at least one chirped pulse amplifier.

11. A non linear optical filter capable of transmitting an electromagnetic pulse with a duration of less than about 1 picosecond, comprising:
   an optical focusing system;
   two crystals C1 and C2 lying at the Rayleigh distance from said optical focusing system;
   wherein said optical focusing system generates a linear polarization from the pulse and wherein crystal C1 of cubic geometry capable of generating an electromagnetic field $E'_1$ from E with a linear polarization orthogonal to that of E;
   at least one other crystal C2 of cubic geometry, capable of receiving the field $E'_1$ at the entry and of generating the field $E'_2$ at the exit and capable of producing constructive interferences with the electromagnetic field $E'_1$.

12. The filter according to claim 11, wherein it furthermore comprises means for forming an image of C1, and in that the other crystal C2 coincides with the image of the crystal C1.

13. The filter according to claim 12, wherein the means for forming the image of the crystal C1 comprise an optical focusing system lying between the two crystals C1 and C2.

14. The filter according to claim 13, wherein the means for generating the field E comprise an optical focusing system, and in that the means for forming the image of the crystal C1 include the optical focusing system and the crystal C1 capable of generating a self-focusing phenomenon of focal length fc.

15. The filter according to claim 13, wherein the means for generating the field E comprise an optical focusing system, and in that the means for forming the image of the crystal C1 include the optical focusing system and the crystal C1 capable of generating a self-focusing phenomenon of focal length fc.

* * * * *